C. G. SURBER.
REGISTER.
APPLICATION FILED JAN. 22, 1915.
1,283,959.
Patented Nov. 5, 1918.
3 SHEETS—SHEET 1.
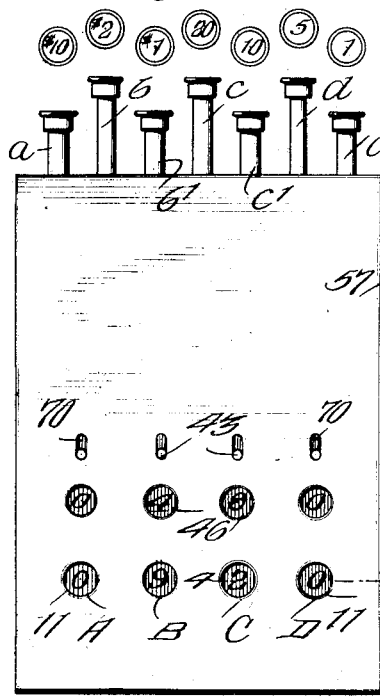
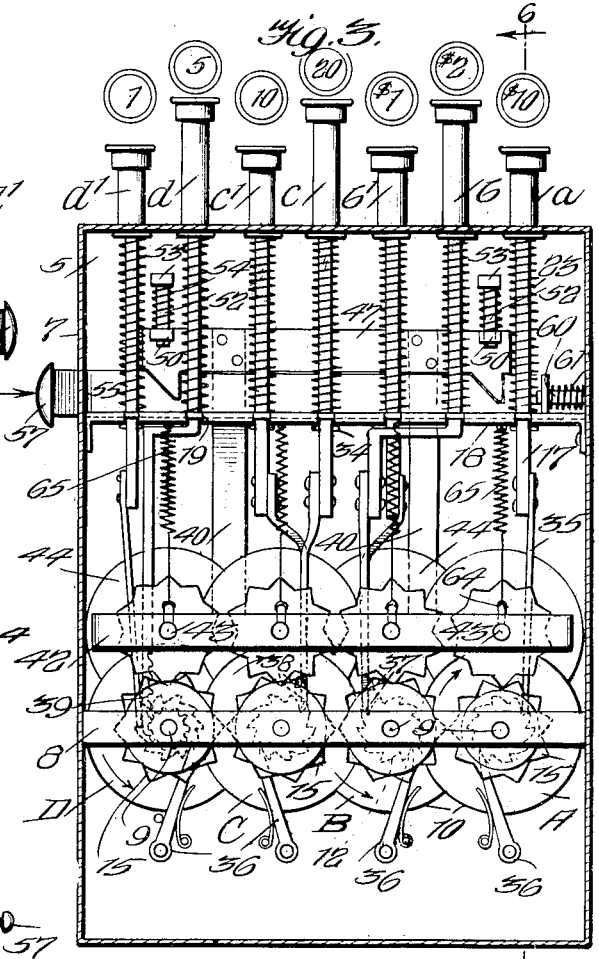
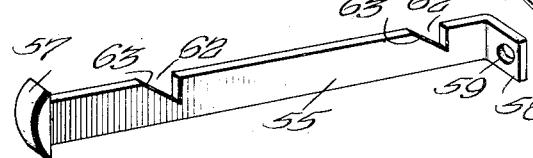
WITNESSES
INVENTOR
CHARLES G. SURBER,
BY Munn & Co.
ATTORNEYS C. G. SURBER.
REGISTER.
APPLICATION FILED JAN. 22, 1915.
1,283,959.
Patented Nov. 5, 1918.
3 SHEETS—SHEET 2.
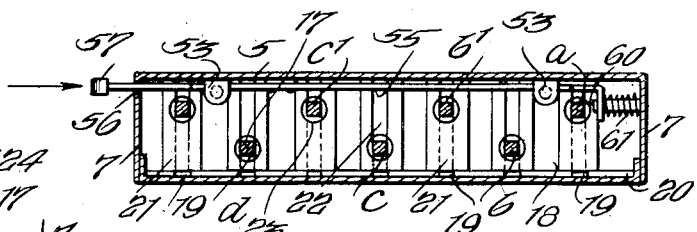
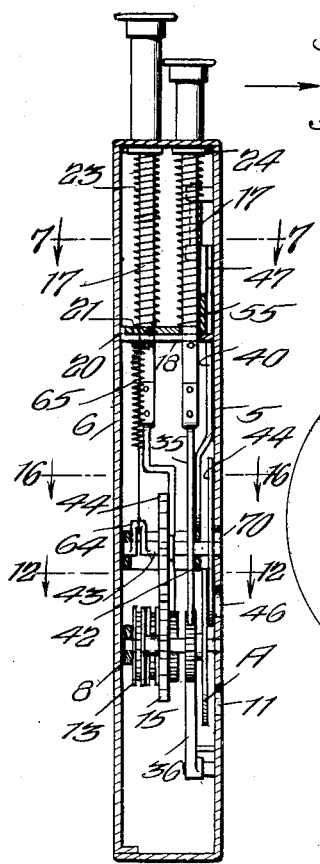
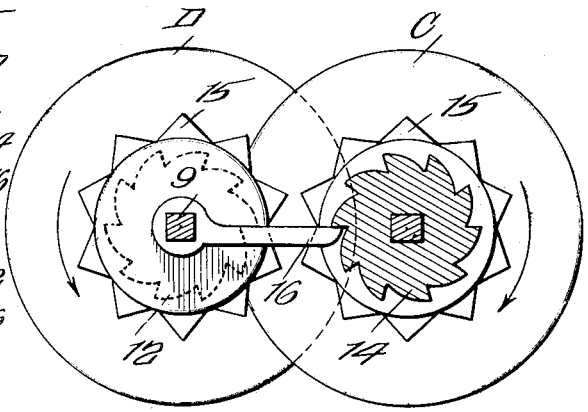
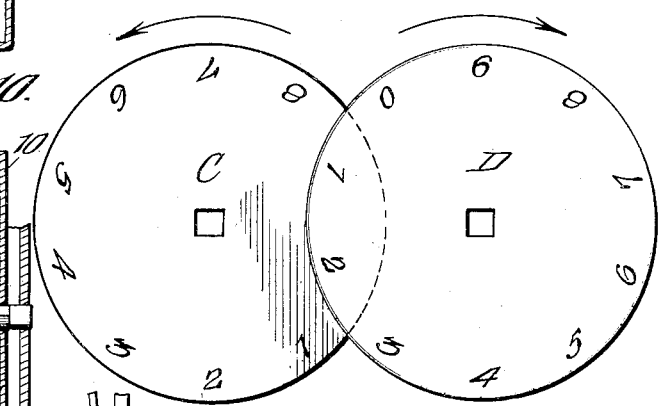
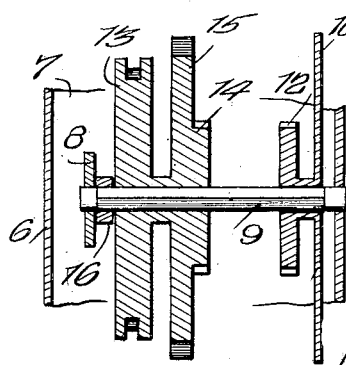
WITNESSES
INVENTOR
CHARLES G. SURBER,
BY Munn & Co.
ATTORNEYS

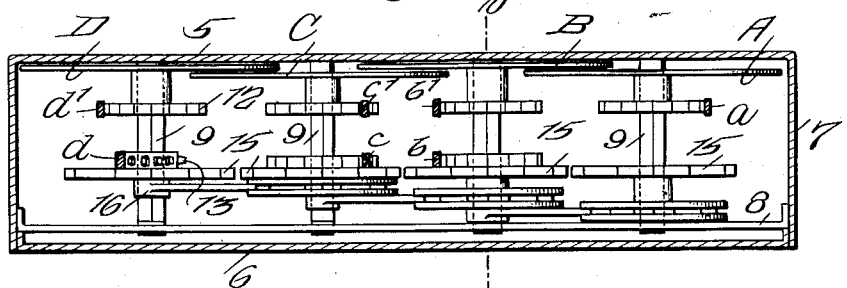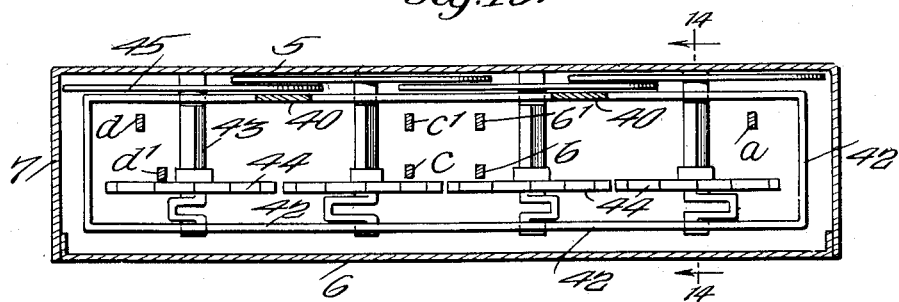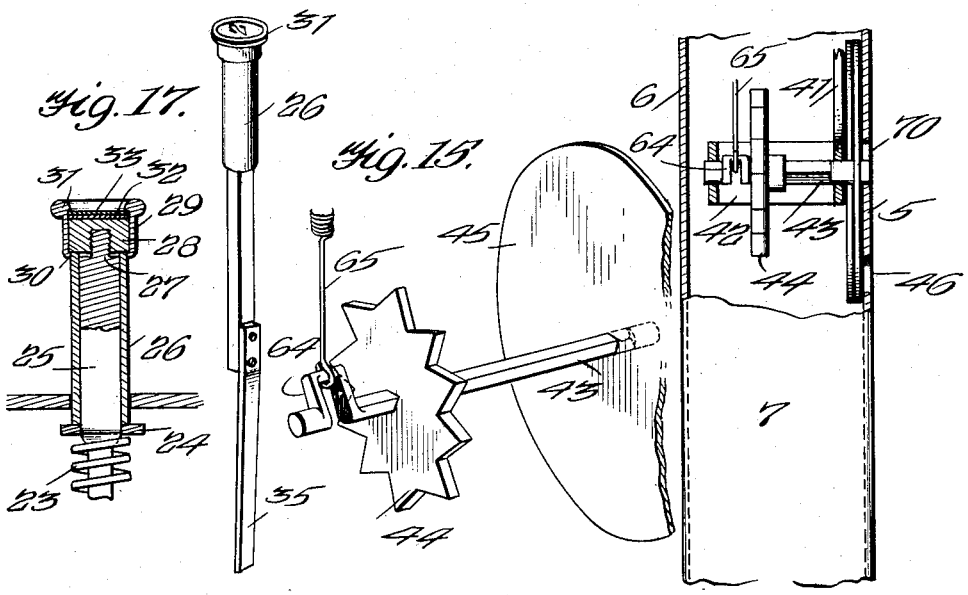

UNITED STATES PATENT OFFICE.

CHARLES GORDON SURBER, OF CARLOOVER, VIRGINIA.

REGISTER.

1,283,959.  Specification of Letters Patent.  Patented Nov. 5, 1918.

Application filed January 22, 1915. Serial No. 3,710.

*To all whom it may concern:*

Be it known that I, CHARLES G. SURBER, a citizen of the United States, residing at Carloover, in the county of Bath and State of Virginia, have invented certain new and useful Improvements in Registers, of which the following is a specification.

This invention relates to an improvement in registers.

One of the principal objects of the invention is to provide a pocket register which will be of particular use to the traveling salesman and the like and by means of which an account of daily and total expenses incurred on a trip may be accurately kept.

Another object of the invention is to provide a register having a series of disks adapted to register the total amount of expenses, and having a second series of disks adapted to indicate the amount of expenses during any particular space of time, means being provided whereby the second series of disks may be set at zero at will, without affecting the first series.

Still another object of the invention is to provide an improved register of the type set out which will be comparatively simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents a front elevational view of the register constructed according to my invention.

Fig. 2 represents a top plan view thereof.

Fig. 3 represents a rear elevational view with the rear wall removed to disclose the interior structure of the register.

Fig. 4 represents a perspective view of the plunger for operating the indicator disk carrying frame.

Fig. 5 represents a perspective view of the indicator disk carrying frame.

Fig. 6 represents a vertical transverse sectional view taken on the plane indicated by the line 6—6 of Fig. 3.

Fig. 7 represents a horizontal sectional view taken on the plane indicated by the line 7—7 of Fig. 6.

Fig. 8 represents a rear face view of a pair of registering disks showing the manner in which motion is imparted to one disk from the other.

Fig. 9 represents a front face view of a pair of registering disks.

Fig. 10 represents a detail vertical transverse sectional view taken on the plane indicated by the line 10—10 of Fig. 12.

Fig. 11 represents a rear face view of one of the registering disks showing the pinion and ratchet mechanism by which the registering disks are actuated.

Fig. 12 represents a horizontal section view taken on the plane indicated by the line 12—12 of Fig. 6.

Fig. 13 represents a perspective view of one of the disk operating plungers.

Fig. 14 represents a fragmentary vertical transverse sectional view taken on the plane indicated by the line 14—14 of Fig 16.

Fig. 15 represents a perspective view of one of the indicator disks and the mechanism by which it is controlled.

Fig. 16 represents a horizontal sectional view taken on the plane indicated by the line 16—16 of Fig. 6.

Fig. 17 represents a detail vertical sectional view taken on the plane indicated by the line 17—17 of Fig. 2.

Fig. 18 represents a detail face view of a portion of the apparatus shown in Fig. 3 indicating the construction and arrangement of the lower portions of plungers *b* and *c*.

In carrying out my invention I provide a hollow casing which is preferably of a rectangular shape, and is of such a size as to be conveniently accommodated in a suitable pocket of the user's garments. The mechanism by which the daily and total expense register is kept is housed within this casing. The casing comprises a front wall 5, a rear wall 6, end walls 7 and top and bottom walls. Near the lower end of the casing and adjacent rear walls 6 is disposed a bar 8, connected at its ends to the end walls 7 of the casing.

Bar 8 and the portion of front wall 5 opposite said bar act as bearings for the spaced parallel shafts 9 on which the four registering disks 10 are separately carried. These disks are provided on their front faces, that is those faces adjacent wall 5, with the usual cipher and nine digits. The numerals on the disks may be viewed through the lower row of openings 11 provided in the front wall of the casing as the disks are rotated by the mechanism hereinafter described.

The numerals carried by the pair of disks 10 shown at the right of Fig. 3, and which may be viewed through the pair of openings 11 occurring at the left of Fig. 1, are adapted to represent the expenditures in dollars while the numerals on the remaining two disks 10 are adapted to represent the expenditures in cents. That is four disks 10 are adapted to be actuated in such manner as to reveal the total expenses in dollars and cents of a trip. The tens disk, units disk, tenths disks and hundredths disks are, for convenience, lettered A, B, C, and D, respectively. This series of disks is referred to for convenience as the registering disks.

Each shaft 9 carries a ratchet wheel 12, a pinion 13, a cog wheel 14 (which may be in the form of a ratchet wheel), a star wheel 15 and a finger 16. The exception should be made that the disk does not have a finger 16 associated with it.

The registering disks are adapted to be actuated by the plungers indicated generally at 17. The plungers are maintained for vertical reciprocation in the top of the casing and in a horizontal plate 18 carried by the casing in spaced relation to the top, and are disposed in the upper portion of said casing. The plungers operate through openings provided in the top and as indicated in Fig. 7 through slots 19 provided transversely of plate 18. Slots 19 extend from the rear edge of the plate toward the front wall of the casing. Said rear edge is provided with an upturned flange 20, between which and front wall 5 clips 21 are maintained. These clips are slotted as at 22 and after the plungers 17 are disposed in slots 19 in assembling the device, are slipped over the plungers in the manner indicated in Fig. 7 and engage between flange 20 and wall 5 so as to prevent lateral displacement of the plungers. At the same time said plungers may be removed by lifting clips 21 to clear flange 20. Surrounding the plungers between plate 18 and the top of the casing, are the coiled springs 23. The springs bear at their lower ends against clips 21 and at their upper ends against collars 24 carried by the plungers. By referring to Fig. 17 it will be noted that the upper end of each plunger is round as at 25 and carries a sleeve 26, which bears at its lower end against collar 24. The sleeve as indicated slidably extends through an opening in the top of the casing. The upper end of the plunger is reduced and threaded as at 27 for the reception of a polygonal nut 28. The latter is incased in a cap 29 which is turned at its lower end upon the nut 30. The upper end of cap 29 is provided with an inwardly extending flange or bead 31 overhanging nut 28 and maintaining a tag 32 covered by a transparent plate 33, against said nut. The upward movement of the plungers is limited by pins 34, carried by the plungers and adapted to engage against the lower face of plate 18. The plungers are each provided with a spring pawl 35, which are adapted to actuate the registering disks in the directions indicated by the arrows in various figures. The disks are maintained against rotation in reverse directions by the spring controlled detents 36, which are pivoted to the front wall of the casing and which are adapted to engage the teeth of the ratchet wheels associated with the disks.

The arrangement is such that tens disk A may be operated by a single plunger $a$, the units disk B operated by a pair of plungers $b$ and $b'$, the tenths disk C by a pair of plungers $c$ and $c'$, and the hundreths disk D by a pair of plungers $d$ and $d'$. The tags carried upon the upper ends of the plungers $a$, $b$ and $b'$, which operate the tens and units disks may be of one color while those carried upon the upper ends of plungers $c$, $c'$ and $d$ and $d'$, which operate the tenths and hundredths disks are of a different color. The tags carried by plungers $a$ to $d'$ inclusive are provided respectively with the following numerals, 10, 2, 1, 20, 10, 5, and 1, as indicated diagrammatically in Figs. 1 and 3.

The spring pawl carried by plunger $a$ is adapted to engage the ratchet wheel carried by disk A. The spring pawl carried by plunger $b$ is provided with two teeth 37 adapted to engage the pinion associated with disk B and to move said pinion two spaces when plunger $b$ is depressed to its full extent, whereby to rotate disk B two spaces. The spring pawl carried by plunger $b'$ is adapted to engage with and to actuate the ratchet wheel associated with disk B one space when depressed. The pawl carried by plunger $c$ is provided with a pair of teeth 38 adapted to engage and actuate the pinion associated with disk C two spaces, whereby to rotate disk C two spaces when said plunger $c$ is depressed.

The pawl carried by plunger $c'$ is adapted to engage the ratchet associated with disk C for rotating said disk one space when the plunger $c^1$ is depressed. The pawl carried by plunger $d$ is provided with five teeth 39 for engaging the pinion associated with disk D whereby to rotate said disk D five spaces when said plunger is depressed and the pawl carried by plunger $d'$ is adapted to engage the ratchet associated with disk D for moving disk D one space when said plunger $d'$ is depressed.

Each ratchet 12 and cog wheel 14 carries ten teeth. As before stated each disk except disk A has a finger 16 associated therewith. Upon rotation of disk D, for instance, it will be noted by reference to Figs. 8 and 12 that upon every complete rotation of said disk the finger 16 will engage one of the teeth of cog wheel 14 associated with disk C so as to rotate the latter one-tenth of a revolution. Upon every complete rotation of disk C the finger associated therewith will cause the rotation of disk B one-tenth of a revolution, and in the same manner disk A is rotated one-tenth of a revolution upon every complete revolution of disk B. Upon every distribution of money for any expense, the keys indicating the amount are successively pressed and the amount of the expenditure will be registered through the openings 11 in the casing. Upon every subsequent operation of the keys in adding successive expenditures, the total amount will be registered. Thus assume that the register is at 0, and an expenditure of $5 is made. Key $b$ is pressed twice thus actuating disk B for four spaces, and key $b'$ will then be actuated so as to shift disk B another space making a total of five spaces. The numeral 5 carried by this disk will thus appear at the units opening in the casing. Let us say that the next expenditure is ten cents. The plunger $c'$ may be depressed thus shifting disk C one space so that figure 1 will appear at the tenths opening in the casing, or plunger $d$ might be pressed twice thus causing disk D to make a complete revolution returning said disk to 0 and incidentally shifting disk C one space by reason of the engagement of the finger carried by associating disk D by the cog wheel associated with disk B. In this manner as the expenditures are made the total amount will be registered in the lower row of openings 11.

The frame indicated in perspective in Fig. 5 is disposed within the casing and is movable vertically therein. The frame comprises a pair of spaced uprights 40 off-set at their lower ends at 41. The lower ends of uprights 40 are connected to one side of a horizontally disposed journal frame 42. The latter is somewhat less in length and width than the casing, and rotatably carries the parallel spaced shafts 43. The latter at their forward ends extend through vertical slots 70 in the front wall of the casing.

Each shaft 43 has secured thereto a star wheel 44. The star wheels 44 are of the same size and dimensions as star wheels 15, and carry the same number of teeth, namely ten. When the frame is in lower or normal position as indicated in Fig. 3 star wheels 44 mesh with the star wheels 15. Carried upon each shaft 43 is an indicator disk 45. The numerals carried by the indicator disks 45 may be viewed through the upper row of openings 46 provided in the casing.

Uprights 40 bear against the front wall 6 of the casing, and are guided through recesses in the front edge of plate 18 adjacent said wall. Connected to the upper ends of uprights 40 in parallel relation with frame 42, is a bar 47 carrying at its ends a pair of depending lugs 48 provided with beveled edges 49, and further provided with laterally extending ears 50 having openings 51 therein. The ears are adapted to work upon pins 52 carried by lugs 53 projecting rearwardly from the front wall of the casing. Coiled springs 54 disposed on pins 52 between lugs 53 and ears 50 serve to maintain the sliding framework in lowered position as indicated in Fig. 3.

In order to raise the framework against the tension of springs 54, there is provided, as indicated in Fig. 4, a plunger 55. This plunger rests upon the plate 18 and at its outer end projects through an opening 56 in one end wall 7 of the casing and is provided with a thumb hold 57. The inner end of the plunger is off-set at right angles at 58 and provided with an opening 59 through which a pin 60 carried by the opposite end wall 7 extends. A coiled spring 61 interposed upon the pin between last said end wall and the off-set portion 58 tends to maintain the plunger in outward or normal position as indicated in Fig. 3. The upper edge of plunger 55 is provided with a pair of recesses 62 having beveled portions 63 adapted to co-act with the beveled edges 49 of lugs 48 in raising the movable framework when said plunger is moved inwardly.

Each shaft 43 is provided with an off-set portion 64 to which the lower end of a retractile spring 65 is connected. The upper ends of the springs 65 are secured to the under surface of plate 18. The normal tendency of said springs 65 is to maintain the shafts 43 in such position that the off-set portions 64 thereof are vertical. When in this normal position as indicated in Fig. 3 the upper row of figures visible through the opening reads 0 all the way across. As the registering disks are operated, their star wheels 15 operate the star wheels 44 in mesh with them, and hence the corresponding indicating disks are operated to the same extent as are the registering disks. The indicating disks register the various expenses in the same manner as do the registering disks. In order to compensate for the opposite directions of rotation of the registering and the indicating disks, the numerals on the latter are placed in reverse order to those on the corresponding registering disks. At the end of each day the amount indicated by the indicating disks may be noted and the plunger 57 may then be pushed inwardly thus raising the sliding frame. This will raise shafts 43 together with the disks and star wheels 44 until the latter are out of engagement with the star wheels 15. At this moment the springs 55 against whose tension the upper star wheels 44 are rotated, will swing the shafts 43 back into the position indicated in Fig. 3 so that 0 will be registered through the upper openings 46. Upon releasing the plunger springs 54 and 61 will operate to return the sliding frame and plunger respectively to their normal positions thus again meshing star wheels 44 with star wheels 15. In this manner the daily expense accounts may be kept track of and at the same time the total expenses are consecutively registered by the registering disks A, B, C and D.

The register might be used to advantage in stores, in registering the sales made. Upon every purchase the upper row of disks, that is the indicating disks, will show the amount of the sale, while the lower row, that is the registering disks, will carry the total of the sales made.

Although I have described the preferred embodiment of my invention, I may desire to make such changes in the construction, combination and arrangement of parts thereof as do not depart from the spirit of the invention and the scope of the appended claims.

I claim:—

1. In a register the combination with a registering device adapted to be actuated at will, of a slidable frame movable toward and away from the registering device, an indicating disk journaled upon said frame and having means detachably engaging the registering device when the frame is in normal position, whereby the indicating disk may be rotated upon actuation of the registering device, a bar provided on the frame and having spaced lugs provided with beveled edges, a manually operable plunger arranged relatively to the frame and having beveled edges adapted to coact with the beveled edges of the lugs in raising said frame out of normal position when said plunger is depressed, spring means for normally maintaining the plunger in outward position, spring means for normally maintaining the frame in lowered position, and means for resetting the indicator disk to zero when the frame is moved out of normal position.

2. A register including a journaled registering disk, means for actuating the disk, a longitudinally slidable frame, an indicating disk journaled upon said frame, coacting means between the registering disk and the indicating disk whereby the latter may be rotated upon rotation of the registering disk when the frame is in normal lowered position, resilient means for maintaining the frame in normal lowered position, means operable at will for raising said frame out of normal position, and means for returning the indicator disk to zero when said frame is moved out of normal position.

3. In a register the combination with a rotatable registering disk having a star wheel associated therewith, of a longitudinally movable frame, means controllable at will whereby said frame may be moved toward and away from said disk, a shaft journaled in said frame and provided with an offset portion, a retractile spring connected to the offset portion and operating to place the shaft under tension when it is rotated, an indicator disk carried by the shaft, and a star wheel carried by the shaft and adapted when the frame is in normal position to interlock with the star wheel associated with the indicator disk, and when the frame is moved out of normal position to unlock therefrom whereby the indicator disk may be automatically moved back to zero.

4. A register including a casing, a plate disposed within the casing and provided with a transversely extending slot, a plunger extending through said slot and through an opening in the top of the casing, a clip provided with a slot engaging over said plunger and resting against said plate, said plate being provided with a flange in spaced relation to the adjacent wall of the casing, said clip engaging between said flange and wall, a collar disposed on said plunger, and a spring disposed between said clip and collar and engaging at its ends against them serving to retain the clip in position and the plunger in normally extended position.

5. A register including a casing, a series of registering disks journaled within the casing, means for operating said disks at will, a frame guided for sliding movement within the casing, a bar carried by the frame, a manually operable spring controlled plunger disposed for sliding movement in the casing, coacting wedging means between the plunger and bar for raising the frame when said plunger is depressed, a series of indicator disks carried by the frame and provided with means adapted to be actuated by the registering disks when the frame is lowered for actuating said indicator disks, and means for returning the indicator disks to zero when said frame is raised.

6. In a register, a casing, a registering disk rotatable in the casing, means for actuating the registering disks, a movable frame arranged in the casing, an indicator disk journaled in the frame, coacting means including star wheels between the indicator disks and the registering disk whereby the former will be actuated upon actuation of the latter, means placing the indicator disk under tension when actuated by the registering disk whereby when the frame is shifted out of normal position the indicator disk will return to zero, and means for shifting the frame at will.

CHARLES GORDON SURBER.

Witnesses:
   JOE A. WALKER,
   W. M. MAY.